United States Patent
Wu et al.

(10) Patent No.: US 7,274,739 B2
(45) Date of Patent: Sep. 25, 2007

(54) METHODS AND APPARATUS FOR IMPROVING VIDEO QUALITY IN STATISTICAL MULTIPLEXING

(75) Inventors: Siu-Wai Wu, San Diego, CA (US); Yong He, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 720 days.

(21) Appl. No.: 10/441,334

(22) Filed: May 19, 2003

(65) Prior Publication Data

US 2004/0233998 A1 Nov. 25, 2004

(51) Int. Cl.
*H04N 7/12* (2006.01)

(52) U.S. Cl. ............................ 375/240.01; 375/240.07; 375/240.26

(58) Field of Classification Search ............................... 375/240.01–240.29
See application file for complete search history.

(56) References Cited

U.S. PATENT DOCUMENTS 5,801,779 A * 9/1998 Uz et al. ............... 375/240.24
5,878,166 A * 3/1999 Legall ........................ 382/232
6,038,256 A   3/2000 Linzer et al.

OTHER PUBLICATIONS

"Coded Representation of Picture and Audio Information: Test Model 5", ISO/IEC JTC1/SC29/WG11 MPEG93/457, Apr. 1993, pp. 61-65 (10 pages.

* cited by examiner

*Primary Examiner*—Andy S. Rao
(74) *Attorney, Agent, or Firm*—Thomas Bether, Jr.

(57) ABSTRACT

The present invention provides methods and apparatus for improving video quality in statistical multiplexing. For each encoding channel in a statistical multiplexer, a respective bit rate need parameter is calculated for encoding of a current frame in that encoding channel. A video buffering verifier level (VBV_Fullness) available to each encoding channel is also calculated. It is then determined whether the VBV_Fullness available to each encoding channel is sufficient for encoding the current frame of that encoding channel based on an initial complexity estimate for that current frame. In the event that the VBV_Fullness is determined to be sufficient, the current frame is encoded using the need parameter. In the event that the VBV_Fullness is determined to be insufficient, the need parameter is scaled by an adaptive panic multiplier and the current frame is encoded using the scaled need parameter.

20 Claims, 2 Drawing Sheets

METHODS AND APPARATUS FOR IMPROVING VIDEO QUALITY IN STATISTICAL MULTIPLEXING

BACKGROUND OF THE INVENTION

The present invention relates to the field of digital video compression. More specifically, the present invention relates to a statistical multiplexing algorithm designed to improve video quality.

In prior art statistical multiplexing schemes with limited group bandwidth, the bit rate demand (i.e. the "need parameter") may be high on a large number of video channels simultaneously. In such an instance, a video channel may not receive the bandwidth it requires to maintain video quality. As a result, the encoder for that video channel will be forced into a panic quantization mode to prevent a video buffering verifier (VBV) model from underflowing, resulting in blocky video. In the panic quantization mode, all discrete cosine transformation (DCT) coefficients may be discarded.

Commonly assigned U.S. patent application Ser. No. 09/806,390, filed on Mar. 29, 2001 discloses one scheme for avoiding panic quantization mode in certain circumstances. In particular, the encoding of an I-frame is delayed when the VBV model does not have enough capacity to support an intra-coded (I) frame. However, there is a limitation in such a scheme that the I-frames cannot be spaced an infinite distance apart. Therefore, in a practical implementation of the invention described in U.S. patent application Ser. No. 09/806,390, the encoder is forced to encode an I-frame irregardless of the status of the VBV when the distance from the previous I-frame exceeds a predefined upper bound. If the buffer model does not have sufficient room to hold a normal I-frame, the encoder will be forced into panic quanitzation mode to avoid VBV underflow.

It would be advantageous to eliminate any potential for encoding in a panic quantization mode. It would be advantageous to artificially increase the bandwidth need parameter when the encoder delays encoding of an I-frame due to a buffer constraint, thereby increasing the share of bandwidth in that encoding channel.

The methods and apparatus of the present invention provide the foregoing and other advantages.

SUMMARY OF THE INVENTION

The present invention relates to methods and apparatus for increasing video quality during statistical multiplexing by avoiding a panic quantization mode. In particular, the present invention artificially increases the bandwidth need parameter for an encoding channel when the encoder delays encoding of an I-frame due to a buffer constraint, thereby increasing the encoder's share of the total available bandwidth. As the encoder obtains more bandwidth, more room is made available in the buffer model to accommodate the upcoming I-frame, thereby avoiding the panic quantization mode.

In an example embodiment of the invention, a method for improving video quality in statistical multiplexing is provided. For each encoding channel in a statistical multiplexer, a respective bit rate need parameter is calculated for encoding of a current frame in that encoding channel. A decoder video buffering verifier level (VBV_Fullness) available to each encoding channel is also calculated. It is then determined whether the VBV_Fullness available to each encoding channel is sufficient for encoding the current frame of that encoding channel based on an initial complexity estimate for that current frame. In the event that the VBV_Fullness is determined to be sufficient, the current frame is encoded using the need parameter. In the event that the VBV_Fullness is determined to be insufficient, the need parameter is scaled by an adaptive panic multiplier and the current frame is encoded using the scaled need parameter.

In one example embodiment, the current frame may be an I-frame. Each need parameter may be generated using look-ahead complexity from first pass encoding of a plurality of frames in a look-ahead pipeline for that encoding channel. The plurality of frames include the current frame.

Where the VBV_Fullness is determined to be insufficient, it may then be determined whether a current Group of Pictures (GOP) length is greater than a normal GOP length. The current GOP length is the number of frames encoded since the last encoded I-frame. The normal GOP length is the preset number of frames between consecutive I-frames. If the current GOP length is less than the normal GOP length, intra-coding of the I-frame may be disabled and the current frame may be encoded using the need parameter. If the current GOP length is greater than the normal GOP length, the bit rate need parameter may be scaled by the panic multiplier and the current frame may be encoded using the scaled need parameter.

In one example embodiment of the invention, the VBV_Fullness is determined to be insufficient when:

$$\text{Current Frame VBV\_Fullness} - X*R < \text{Threshold}$$

In this equation, Threshold is a number of bits proportionate to bandwidth assigned the current picture on the respective channel. The variable R is the number of bits generated by the first pass encoding of the current frame. The variable X is a weighting parameter (with a value between zero and one) corresponding to a minimum bit rate required for encoding the current frame. Current Frame VBV_Fullness corresponds to the number of bits estimated by a VBV buffer for encoding the current frame. In an example implementation, X may be approximately 0.67.

The panic multiplier may be a variable which is dependent on an intra-coding status of the current frame and the intra-coding status of at least one previous frame. The panic multiplier may be provided by:

$$\text{Panic\_Multiplier} = 1 + f(W)$$

Where f(W) is a positive monotonic non-decreasing function of W (i.e., f(W)>0 and f(W) either increases or remain unchanged when W increases). In an example implementation, f(W)=Y*W. The variable Y may be a scalar variable within the range of 0 and 1. The variable Y controls the reaction of the need parameter to the buffer level demand. The variable W designates a number of previous frames for which intra-coding has been disabled out of a predetermined number of previous frames preceding the current frame. In an example implementation, Y may be approximately 0.1. The variable W may be defined as W=0, 1, 2, 3, . . . z, where z is the predetermined number of previous frames which precede the current frame. In another example implementation, f(W) may be implemented as a look up table.

The present invention also provides apparatus for improving video quality in statistical multiplexing capable of implementing the method described above. One example embodiment of the present invention includes a first pass encoder for calculating an initial complexity estimate for encoding a current frame. A video buffer verifier is provided for calculating a video buffering verifier level (VBV_Fullness) available to each encoding channel. A second pass encoder is also provided. The second pass encoder is capable of calculating an initial bit rate need parameter for a current frame to be encoded. The second pass encoder is also capable of determining whether the VBV_Fullness, available to each encoding channel, is sufficient for encoding the current frame of that encoding channel based on the initial complexity estimate for that current frame. In the event that the VBV_Fullness is determined to be sufficient, the current frame is encoded using the need parameter. In the event that the VBV_Fullness is determined to be insufficient, the need parameter is scaled by an adaptive panic multiplier and the current frame is encoded using the scaled need parameter.

In one example embodiment, the current frame may be an I-frame. A look-ahead pipeline may be provided for buffering a plurality of frames. The second pass encoder may generate the need parameter using look-ahead complexity from first pass encoding of a plurality of frames in the look-ahead pipeline for that encoding channel. The plurality of frames may include the current frame.

When the second pass encoder determines the VBV_Fullness to be insufficient, the second pass encoder may also determine whether a current Group of Pictures (GOP) length is greater than a normal GOP length. If the current GOP length is less than the normal GOP length, the second pass encoder disables intra-coding of the I-frame and encodes the current frame using the need parameter. If the current GOP length is greater than the normal GOP length, the second pass encoder scales the bit rate need parameter by the panic multiplier and encodes the current frame using the scaled need parameter.

In a further example embodiment of the present invention, the second pass encoder may determine the VBV_Fullness to be insufficient when:

$$\text{Current Frame VBV\_Fullness} - X*R < \text{Threshold}$$

In this equation, Threshold is a number of bits proportionate to bandwidth assigned the current picture on the respective channel. The variable R is the number of bits generated by the first pass encoding of the current frame. The variable X is a weighting parameter corresponding to a minimum bit rate required for encoding the current frame. X is a positive number smaller than 1. Current Frame VBV_Fullness corresponds to the number of bits estimated by a VBV buffer for encoding the current frame. In an example implementation, X may be approximately 0.67.

The panic multiplier may be a variable which is dependent on an intra-coding status of the current frame and the intra-coding status of at least one previous frame. The panic multiplier may be provided by:

$$\text{Panic\_Multiplier} = 1 + f(W)$$

Where f(W) is a positive monotonic non-decreasing function of W (i.e., f(W)>0 and f(W) either increases or remain unchanged when W increases). In an example implementation, f(W)=Y*W. The variable Y may be a scalar variable within the range of 0 and 1. The variable Y controls the reaction of the need parameter to the buffer level demand. The variable W designates a number of previous frames for which intra-coding has been disabled out of a predetermined number of previous frames preceding the current frame. In an example implementation, Y may be approximately 0.1. The variable W may be defined as W=0, 1, 2, 3, . . . z, where z is the predetermined number of previous frames which precede the current frame. In another example implementation, f(W) may be implemented as a look up table.

The methods and apparatus of the present invention may be implemented using various combinations of hardware, software, and firmware. The present invention is suitable for use with both high definition television (HDTV) encoders and transcoders and standard definition television (SDTV) encoders and transcoders.

BRIEF DESCRIPTION OF THE DRAWINGS

The present invention will hereinafter be described in conjunction with the appended drawing figures, wherein like reference numerals denote like elements, and.

DETAILED DESCRIPTION

Figure 1:
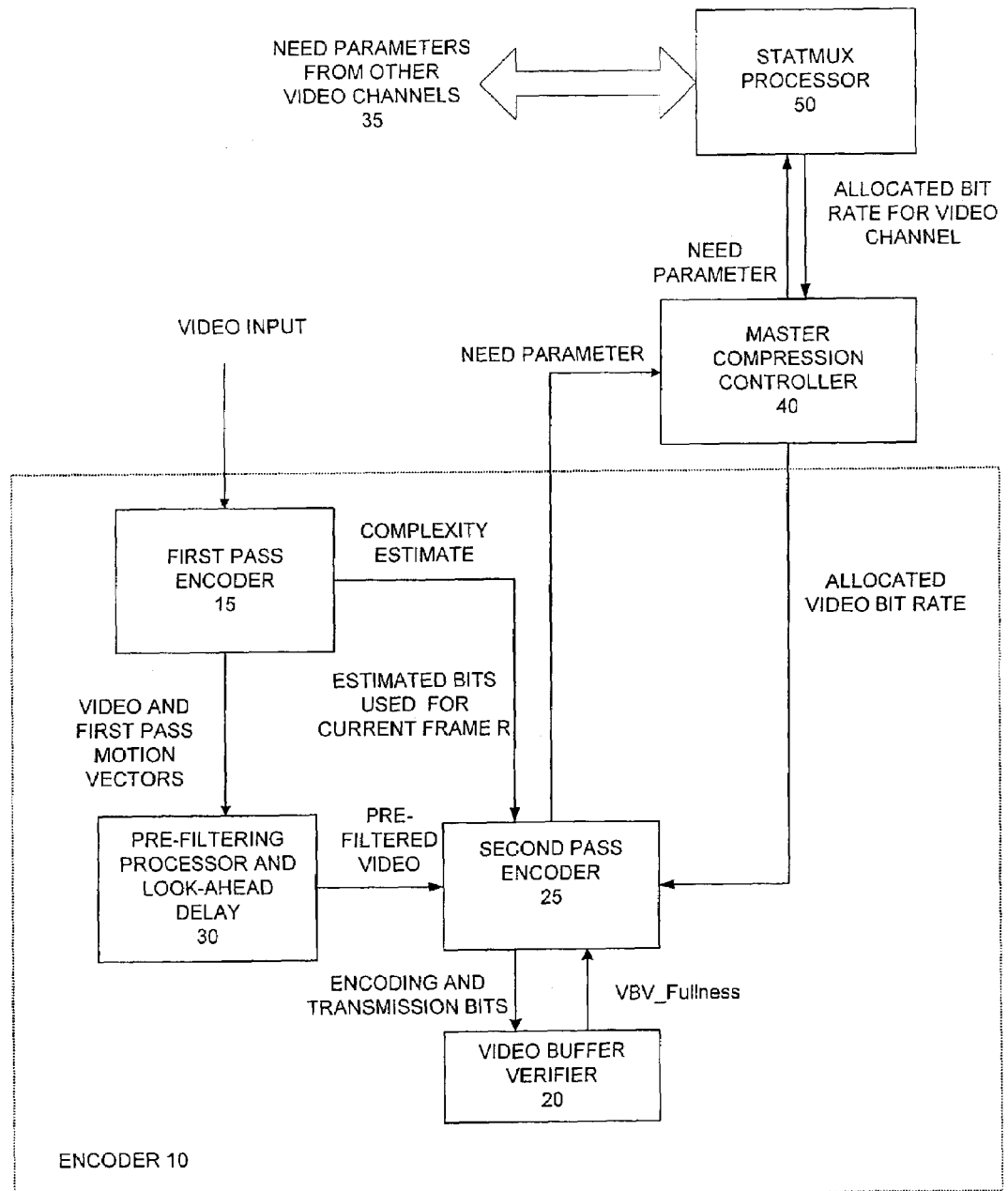
FIG. 1 shows a block diagram of an example embodiment of the present invention.

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an embodiment of the invention. It should be understood that various changes may be made in the function and arrangement of elements without departing from the spirit and scope of the invention as set forth in the appended claims.

In prior art statistical multiplexing schemes, a need parameter may be calculated from the complexity estimate for the frame, taking into account the impact of various special events (e.g., scene changes, dissolves, fades, flashes, explosions, jerky motion, and the like). The statistical multiplexing algorithm then assigns an encoding bit rate to the encoder in proportion to the need parameter. Examples of such prior art encoding schemes are disclosed in commonly assigned U.S. patent application Ser. No. 09/665,373 filed on Sept. 20, 2000, entitled "Method and Apparatus for Determining A Bit Rate Need Parameter in A Statistical Multiplexer" and commonly owned U.S. patent application Ser. No. 10/183,197 filed on Jun. 25, 2003, entitled "Methods and Apparatus for Statistical Multiplexing During Dual Pass Encoding".

For example, for each video frame, the original statistic multiplexing need parameter may be calculated as follows:

Original
Need_Parameter=SceneChangeMultiplier*Activity
Multiplier*
LowMotionMultiplier*DarkSceneMultiplier*FrameRate*
FilmMultiplier*InitialNeedParameter.

The Scene Change Multiplier may be used to improve the video quality of flashes, which are often detected as multiple scene changes. The Activity Multiplier may be increased as the activity detected between frames increases. The Low Motion Multiplier may be increased where there is little motion between frames. The Dark Scene Multiplier may be increased to accommodate darker scenes. The Film Multiplier may be increase to accommodate film mode.

For each video frame to be encoded, the video buffering verifier (VBV) available buffer is calculated for the current frame as follows:

Current frame VBV_Fullness=Vbv_channel_bits−
Current_Fifo_Bits−Current_Bits_Used.

In this formula, Vbv_channel_bits is the accumulation of the bit rate over system delay time, Current_Fifo_Bits is the bits available in FIFO buffer to be transmitted, and Current_Bits_Used is the bits used to encode current picture.

Based on the Current frame VBV_Fullness and the complexity from first pass encoding, the next frame VBV_Fullness can be estimated as follows:

Estimated next frame VBV_Fullness=Current frame VBV_Fullness+Bits_to_be_transmitted−Next_Bits_Budget.

In this formula, Bits_to_be_transmitted is the number of bits to be transmitted from the FIFO buffer during the next frame encoding period, and Next_Bits_Budget is the estimated bits used for next picture.

In such prior art encoding schemes the need parameter may be generated from a complexity estimated from first pass encoding and various special events impact, such as scene change, dark scene, and flash, etc. There may be no video break-up (i.e., excessive blocking artifacts due to panic quantization) except for the current frame to be encoded as an I-frame (given the low encoding bandwidth assigned), or extremely complex video presented in the rest of the group members.

The present invention provides methods and apparatus for improving video quality in statistical multiplexing. More specifically, the present invention provides an improved scheme that takes advantage of VBV buffer estimation and look-ahead complexity from first pass encoding for scaling the need parameter used in statistical multiplexing. In the event that the available bit rate is not enough to handle the complexity of particular picture to be encoded as an I-frame, the present invention provides an adaptive multiplier which is used to scale the need parameter so that more bits are assigned to the encoder, such that none of the statistic multiplexing group members would be broken up.

One example embodiment of the present invention is shown in FIG. 1. A dual pass encoder 10 in accordance with the invention includes a first pass encoder 15 for calculating an initial complexity estimate for encoding a current video frame. A video buffer verifier 20 is provided for calculating a video buffering verifier level (VBV_Fullness) available to each encoding channel. A second pass encoder 25 is also provided. The second pass encoder 25 is capable of calculating an initial bit rate need parameter for a current frame to be encoded. The need parameter is used by the statmux processor 50 to determine the bit rate for encoding the current frame. More specifically, the statmux processor 50 receives the need parameter from the encoder 10 (e.g., via the master compression controller 40) as well as need parameters 35 from other video channels and allocates the available bandwidth among the video channels. The master compression controller 40 is a processor which controls the second pass encoder 25 in response to the allocated bit rate received from the statmux processor 50.

The second pass encoder 25 is also capable of determining whether the VBV_Fullness available to each encoding channel is sufficient for encoding the current frame of that encoding channel based on the initial complexity estimate (e.g., provided by the first pass encoder 15) for that current frame. In the event that the VBV_Fullness is determined to be sufficient, the current frame is encoded using the need parameter. In the event that the VBV_Fullness is determined to be insufficient, the need parameter is scaled by an adaptive panic multiplier and the current frame is encoded using the scaled need parameter.

In one example embodiment, the current frame may be an I-frame. A look-ahead pipeline may be provided for buffering a plurality of frames. The pre-filtering processor and look-ahead delay 30 delays the video to provide the look-ahead pipeline for use by the second pass encoder 25. The second pass encoder 25 may generate the need parameter using look-ahead complexity from first pass encoding of a plurality of frames in the look-ahead pipeline 30 for that encoding channel. The plurality of frames in the look-ahead pipeline may include the current frame.

When the second pass encoder 25 determines the VBV_Fullness to be insufficient, the second pass encoder 25 may also determine whether a current Group of Pictures (GOP) length is greater than a normal GOP length. If the current GOP length is less than the normal GOP length, the second pass encoder 25 disables intra-coding of the I-frame and encodes the current frame using the need parameter. If the current GOP length is greater than the normal GOP length, the second pass encoder 25 scales the bit rate need parameter by the panic multiplier and encodes the current frame using the scaled need parameter.

In another example embodiment of the present invention, the second pass encoder 25 may determine the VBV_Fullness to be insufficient when:

Current Frame VBV_Fullness−$X*R$<Threshold

In this equation, Threshold is a number of bits proportionate to bandwidth assigned the current picture on the respective channel. The variable R is the number of bits generated by the first pass encoding of the current frame. The variable X is a weighting parameter, of value between 0 and 1, corresponding to a minimum bit rate required for encoding the current frame. Current Frame VBV_Fullness corresponds to the number of bits estimated by a VBV buffer for encoding the current frame. In an example implementation, X may be approximately 0.67.

The panic multiplier may be a variable dependent on an intra-coding status of the current frame and at least one previous frame. The panic multiplier may be provided by:

Panic_Multiplier=1+$f(W)$

Where f(W) is a positive monotonic non-decreasing function of W (i.e., f(W)>0 and f(W) either increases or remain unchanged when W increases). In an example implementation, f(W)=$Y*W$. The variable Y may be a scalar variable within the range of 0 and 1. The variable Y controls the reaction of the need parameter to the buffer level demand. The variable W designates a number of previous frames for which intra-coding has been disabled out of a predetermined number of previous frames preceding the current frame. In an example implementation, Y may be approximately 0.1. The variable W may be defined as W=0, 1, 2, 3, . . z, where z is the predetermined number of previous frames. For practical purposes, z may be in the range of between 4 to 15 previous frames. In another example implementation, f(W) may be implemented as a look up table.

Figure 2:
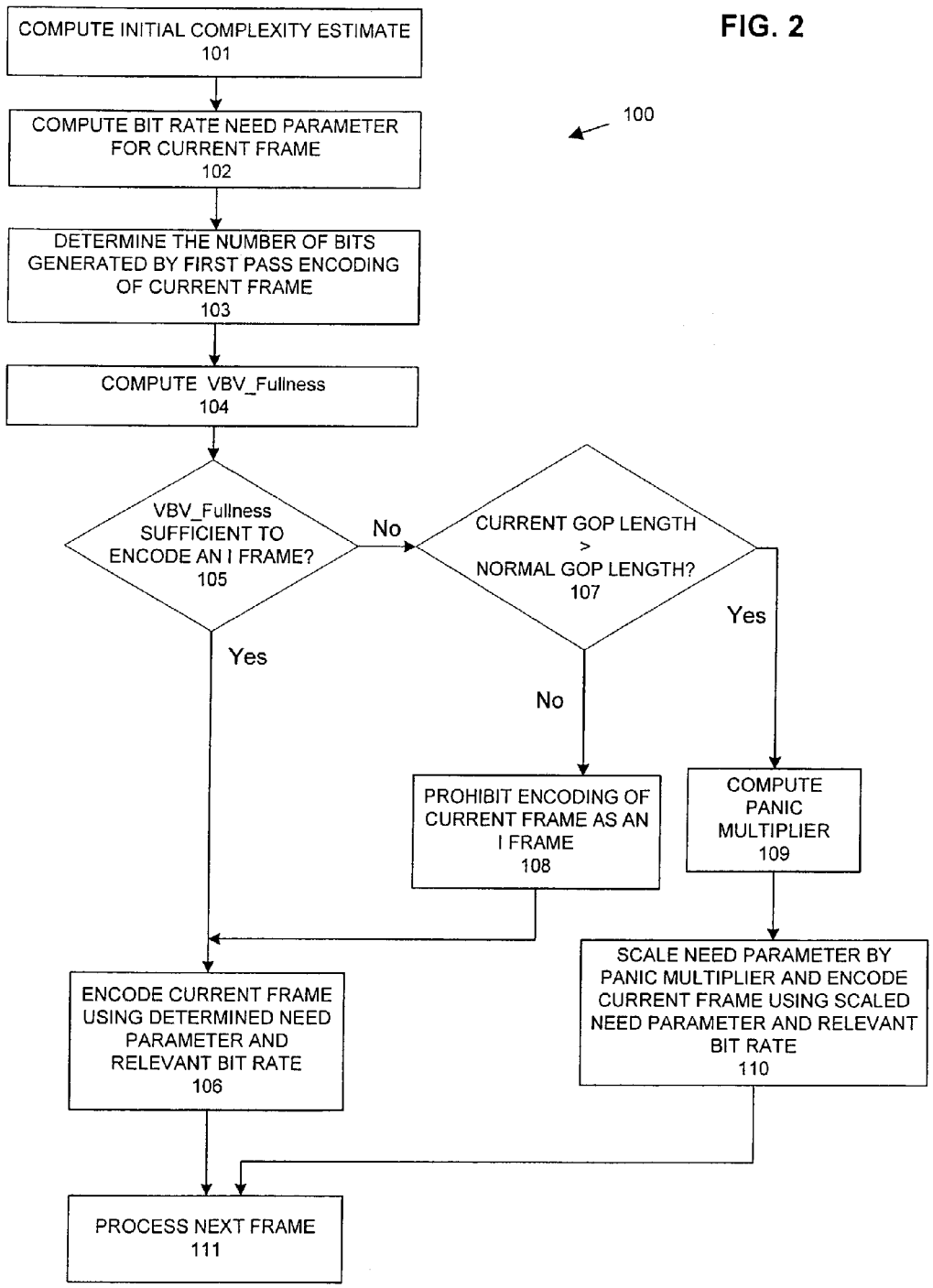
FIG. 2 shows a flowchart of an example embodiment of the present invention.

FIG. 2 is a flowchart illustrating an example method 100 for improving video quality in statistical multiplexing in accordance with the invention. The method 100 occurs for each encoding channel in a statistical multiplexer. The initial complexity estimate is computed by the first pass encoder 15 (step 101). A respective bit rate need parameter is calculated by the second pass encoder 25 for encoding of a current frame (in the example embodiment shown in FIG. 2, the current frame is an I-frame) (Step 102). Then the number of bits generated by the first pass encoder during encoding the current frame is determined (Step 103) A video buffering verifier level (VBV_Fullness) available to each encoding channel is then calculated by the video verifier buffer 20 (Step 104). It is then determined whether the VBV_Fullness available to each encoding channel is sufficient for encoding the current frame of that encoding channel based on an initial complexity estimate for that current frame (Step 105). In the event that the VBV_Fullness is determined to be sufficient, the current frame is encoded using the need parameter (Step 106). In the event that the VBV_Fullness is determined to be insufficient, it may then be determined whether a current Group of Pictures (GOP) length is greater than a normal GOP length (Step 107). If the current GOP length is less than the normal GOP length, intra-coding of the I-frame may be disabled and the current frame may be encoded using the need parameter (Step 108). If the current GOP length is greater than the normal GOP length, the panic multiplier is computed (as described above in connection with FIG. 1) (Step 109). The bit rate need parameter may then be scaled by the panic multiplier and the current frame may be encoded using the scaled need parameter (Step 110). Once the current frame is encoded, the next frame is processed in the same manner (Step 111).

It should now be appreciated that the present invention provides advantageous methods and apparatus for improving video quality during statistical multiplexing.

Although the invention has been described in connection with various illustrated embodiments, numerous modifications and adaptations may be made thereto without departing from the spirit and scope of the invention as set forth in the claims.

What is claimed is:

1. A method for improving video quality in statistical multiplexing, comprising:
   for each encoding channel in a statistical multiplexer, calculating a respective bit rate need parameter for encoding of a current frame in that encoding channel, wherein each need parameter is generated using look-ahead complexity from first pass encoding of a plurality of frames in a look-ahead pipeline for that encoding channel, said plurality of frames including said current frame;
   for each encoding channel in a statistical multiplexer, calculating a video buffering verifier level (VBV_Fullness) available to each encoding channel;
   determining whether the VBV_Fullness available to each encoding channel is sufficient for encoding said current frame of that encoding channel based on an initial complexity estimate for that current frame;
   in the event that the VBV_Fullness is determined to be sufficient, encoding said current frame using said need parameter;
   in the event that the VBV_Fullness is determined to be insufficient, scaling said need parameter by an adaptive panic multiplier and encoding said current frame using said scaled need parameter; and
   wherein if the VBV_Fullness is determined to be insufficient, further comprising:
      determining whether a current Group of Pictures (GOP) length is greater than a normal GOP length; and
      if said current GOP length is less than said normal GOP length, disabling intra-coding of said I-frame in the event that said VBV_Fullness is determined to be insufficient, and encoding said current frame using said need parameter; and
      if said current GOP length is greater than said normal GOP length, scaling the bit rate need parameter by the panic multiplier in the event that said VBV_Fullness is determined to be insufficient, and encoding said current frame using said scaled need parameter.

2. The method of claim 1, wherein said VBV_Fullness is determined to be insufficient when:

$$\text{Current Frame VBV\_Fullness} - X*R < \text{Threshold}$$

wherein:
   Threshold is a number of bits proportionate to bandwidth assigned the current picture on the respective channel;
   R is the number of bits generated by said first pass encoding of said current frame;
   X is a weighting parameter corresponding to a minimum bit rate required for encoding said current frame; and
   Current Frame VBV_Fullness corresponds to the number of bits estimated by a VBV buffer for encoding the current frame.

3. The method of claim 2, wherein X is within a range of 0.5 to 1.

4. The method of claim 2, wherein the panic multiplier is a variable dependent on an intra-coding status of the current frame and at least one previous frame.

5. The method of claim 4, wherein said panic multiplier is provided by:

$$\text{Panic\_Multiplier} = 1 + f(W)$$

wherein:
   f(W) is a positive monotonic non-decreasing function of W; and
   W designates a number of previous frames for which intra-coding has been disabled out of a predetermined number of previous frames preceding the current frame.

6. The method of claim 5, wherein:
   $f(W) = Y*W$; and
   Y is a scalar variable within the range of 0 and 1.

7. The method of claim 6, wherein Y is approximately 0.1.

8. The method of claim 5, wherein:
   the value of f(W) is provided by a look up table.

9. The method of claim 5, wherein:
   W=0, 1, 2, 3, . . . z; and
   Z is the predetermined number of previous frames.

10. An apparatus for improving video quality in statistical multiplexing, comprising for each encoding channel:
   a first pass encoder for calculating an initial complexity estimate for encoding a current frame;
   a video buffer verifier for calculating a video buffering verifier level (VBV_Fullness) available to each encoding channel; and
   a second pass encoder capable of:
      calculating an initial bit rate need parameter for a current frame to be encoded;
      determining whether the VBV_Fullness available to each encoding channel is sufficient for encoding said current frame of that encoding channel based on the initial complexity estimate for that current frame;
      in the event that the VBV_Fullness is determined to be sufficient, encoding said current frame using said need parameter; and
      in the event that the VBV_Fullness is determined to be insufficient, scaling said need parameter by an adaptive panic multiplier and encoding said current frame using said scaled need parameter
   a look-ahead pipeline for buffering a plurality of frames;
   wherein said second pass encoder generates the need parameter using look-ahead complexity from first pass encoding of a plurality of frames in said look-ahead pipeline for that encoding channel, said plurality of frames including said current frame; and wherein said second pass encoder:
  determines the VBV_Fullness to be insufficient;
  determines whether a current Group of Pictures (GOP) length is greater than a normal GOP length; and
  if said current GOP length is less than said normal GOP length, disables intra-coding of said current frame, and encodes said current frame using said need parameter; and
  if said current GOP length is greater than said normal GOP length, scales the bit rate need parameter by the panic multiplier, and encodes said current frame using said scaled need parameter.

11. The apparatus of claim 10, wherein said second pass encoder determines the VBV_Fullness to be insufficient when:

$$\text{Current Frame VBV\_Fullness} - X*R < \text{Threshold}$$

wherein:
Threshold is a number of bits proportionate to bandwidth assigned the current picture on the respective channel;
R is the number of bits generated by said first pass encoding of said current frame;
X is a weighting parameter corresponding to a minimum bit rate required for encoding said current frame; and
Current Frame VBV_Fullness corresponds to the number of bits estimated by a VBV buffer for encoding the current frame.

12. The apparatus of claim 11, wherein X is within a range of 0.5 to 1.

13. The apparatus of claim 11, wherein the panic multiplier is a variable dependent on an intra-coding status of the current frame and at least one previous frame.

14. The apparatus of claim 11, wherein said panic multiplier is provided by:

$$\text{Panic Multiplier} = 1 + f(W)$$

wherein:
$f(W)$ is a positive monotonic non-decreasing function of W; and
W designates a number of previous frames for which intra-coding has been disabled out of a predetermined number of previous frames preceding the current frame.

15. The apparatus of claim 14, wherein:
$f(W) = Y*W$; and
Y is a scalar variable within the range of 0 and 1.

16. The apparatus of claim 15, wherein Y is approximately 0.1.

17. The apparatus of claim 14, wherein:
the value of $f(W)$ is provided by a look up table.

18. The apparatus of claim 14, wherein:
$W = 0, 1, 2, 3, \ldots z$; and
Z is the predetermined number of previous frames.

19. The method of claim 1, wherein said current frame is an I-frame.

20. The method of claim 10, wherein said current frame is an I-frame.

* * * * *

UNITED STATES PATENT AND TRADEMARK OFFICE
CERTIFICATE OF CORRECTION

PATENT NO.         : 7,274,739 B2                                    Page 1 of 1
APPLICATION NO.    : 10/441334
DATED              : September 25, 2007
INVENTOR(S)        : Wu et al.

It is certified that error appears in the above-identified patent and that said Letters Patent is hereby corrected as shown below:

On the Title Page

Item (56), Line 3: please delete "pages" and insert --pages)--

Column 4, Lines 47-51: please delete format:
"Original
    Need_Parameter=SceneChangeMultiplier*Activity
    Multiplier*
    LowMotionMultiplier*DarkSceneMultiplier*FrameRate*
    FilmMultiplier*InitialNeedParameter."

and insert:

--"Original_Need_Parameter = SceneChangeMultiplier * Activity Multiplier * LowMotionMultiplier * DarkSceneMultiplier * Frame Rate * FilmMultiplier * InitialNeedParameter.--

Claim 14:

Column 10, Line 6: please delete "Panic Multiplier=1+f(W)" and insert --Panic_Multiplier=1+f(W)--

Signed and Sealed this

Second Day of June, 2009

JOHN DOLL
*Acting Director of the United States Patent and Trademark Office*